United States Patent
Hessing et al.

(10) Patent No.: US 6,886,829 B2
(45) Date of Patent: May 3, 2005

(54) IMAGE CAPTURING CARD SHUFFLER

(75) Inventors: Lynn Hessing, Boise, ID (US); Daniel Mahoney, Star, ID (US); Steven J. Blad, Henderson, NV (US); Thomas Baker, Meridian, ID (US)

(73) Assignee: VendingData Corporation, Las Vegas, NV (US)

( * ) Notice: Subject to any disclaimer, the term of this patent is extended or adjusted under 35 U.S.C. 154(b) by 400 days.

(21) Appl. No.: 10/067,794

(22) Filed: Feb. 8, 2002

(65) Prior Publication Data

US 2003/0151194 A1 Aug. 14, 2003

(51) Int. Cl.$^7$ .................................................. A63F 1/12
(52) U.S. Cl. ............................. 273/149 R; 273/149 P
(58) Field of Search ........................... 273/149 R, 292, 273/149 P, 463, 293; 463/1, 10–12, 16, 22, 31, 40–43, 47

(56) References Cited

U.S. PATENT DOCUMENTS

| | | | |
|---|---|---|---|
| 4,667,959 A | | 5/1987 | Pfeiffer et al. |
| 4,807,884 A | * | 2/1989 | Breeding ................. 273/149 R |
| 5,067,713 A | | 11/1991 | Soules et al. |
| 5,374,061 A | | 12/1994 | Albrecht |
| 5,605,334 A | | 2/1997 | McCrea, Jr. |
| 5,707,287 A | | 1/1998 | McCrea, Jr. |
| 5,722,893 A | * | 3/1998 | Hill et al. ....................... 463/47 |
| 5,735,525 A | | 4/1998 | McCrea, Jr. |
| 5,779,546 A | | 7/1998 | Meissner et al. |
| 6,093,103 A | | 7/2000 | McCrea, Jr. |
| 6,117,012 A | | 9/2000 | McCrea, Jr. |
| 6,582,301 B2 | * | 6/2003 | Hill ............................. 463/11 |
| 6,588,751 B1 | * | 7/2003 | Grauzer et al. .......... 273/149 R |
| 6,659,460 B2 | * | 12/2003 | Blaha et al. ............ 273/149 R |
| 6,676,127 B2 | * | 1/2004 | Johnson et al. ......... 273/149 R |
| 2002/0068635 A1 | * | 6/2002 | Hill ............................. 463/47 |

* cited by examiner

Primary Examiner—Michael O'Neill
(74) Attorney, Agent, or Firm—Rob L. Phillips; Quirk & Tratos

(57) ABSTRACT

The present invention features a playing card shuffling device, which through the use of a small image capturing means, captures an image of the face value of each card and stores the image in memory. This image is sorted in the format of a bitmap image. The operator of the machine would be able to recall through the use of a key pad, the images of the cards that comprised the individual hands in the previous game. This feature allows for verification of a winning hand after a game has been completed. Thereby, a quick recheck of hands before paying a winning hand is performed. The face value of each card is determined by character recognition software. These card values would be stored in memory for archival access for use in monitoring the randomness of the game and determining the number of winning hands.

16 Claims, 3 Drawing Sheets

IMAGE CAPTURING CARD SHUFFLER

BACKGROUND OF THE INVENTION

1. Field of the Invention

The present invention relates to card shuffler devices for live card games and, more particularly, to a card shuffling system controlled by a computer which is able to capture an image, store, keep track of, and deliver random playing cards and display the images of the cards.

2. Discussion of the Prior Art

Card shuffling machines are electromechanical devices that are designed to reorder a deck or multiple decks of playing cards for use in casino games. Recently, games have been developed that require shuffling a single deck of cards into a random order and the delivery of hands of cards to each player. These hands are removed from the machine by an operator and given to the players. Several game strategies require the hands of cards to be delivered to the players in different amounts depending on the selected game. For example, there may be 3, 5, 7, or more cards per hand in each different game. For security reasons, some shufflers count the number of cards in the deck each time a game is dealt.

With players at numerous remote sites for the live card games, a security problem exists that becomes critically important, as there exists a substantial risk of cheating and/or card counting. A need, therefore, exists to create a secure environment that permits the operation of live card games while providing significant security to prevent cheating and counting.

Pfeiffer, et al., (U.S. Pat. No. 4,667,959) discloses an apparatus for storing and selecting cards. The apparatus contains a rotatably mounted carousel which dispenses playing cards with rollers to slots of an output port. Cards are pre-marked with known markings, such as bar codes, so that the apparatus can keep track of which slot holds which card. A sensor reads the identification markings on the cards.

Soules, et al., (U.S. Pat. No. 5,067,713) teaches of coded playing cards and apparatus for dealing a set of cards. There is provided a deck of cards which is encoded with a bar code that is invisible to the human eye. The cards are coded using an essentially invisible bar code that can be read by an electro-optical reading means which uses light in the infra-red or ultra-violet range. The object of this apparatus is to allow the dealer to deal coded playing cards in the essence of teaching.

The patent to Albrecht (U.S. Pat. No. 5,374,061) discloses a card dispensing shoe having a counting device and method of using. A system is described which uses a specially coded deck of cards indicating the value and suit of the card. The system involves using a special pack of cards encoded with information carrying two types of data: numerical digits and alphabetical characters. The numerical information corresponds to the card value, and the alphabetical information indicates the series of the pack of cards. This information is in the form of the bar code, or some other machine readable format. The sensor senses the code on each card as it is being dealt.

Hill, et al., (U.S. Pat. No. 5,722,893) discloses a card dispensing shoe that has a card scanner. The scanner senses each card as it moves downwardly and out from the shoe. The scanner may be an infrared laser scanner capable of reading a bar code imprinted on the cards. Hill, et al., also discloses the optical scanning of the cards resulting in a high resolution array which is stored in memory for converting into word vectors. These vectors are subsequently used as input to a feed-forward neural network which is trained using error-back propagation to sense and recognize the possible card suits and card values.

Meissner et al. (U.S. Pat. No. 5,779,546) teaches of an automated gaming system and method of automated gaming. An automated dealing shoe automatically advances and interprets the value of a playing card and provides an interface to a computing system. Optical sensors are employed to record the number of spots and their respective spatial relations to thereby determine the card value.

McCrea, Jr. has a series of patents teaching of a card shuffling device having image capturing means. These U.S. Pat. Nos.: 5,605,334; 5,707,287; 5,735,525; 6,093,103; and 6,117,012 disclose the need for game control via accurately collecting and storing the suit and value of each card received by each player position. The game control stores this information in a memory so that a history of each card dealt is recorded. The game control can thus detect winning progressions and automatically issue an award signal.

None of these patents either teaches or suggests a card shuffling device that can shuffle the playing cards in a random order, capture images of the playing cards before output, process the images of the cards, and display the images of the cards, all within the confines of the shuffler. There is no need for complicated card-recognition software, or transforming the image into word vectors, or other card value data expressions, because the images are relayed directly to a display on the shuffler device.

SUMMARY OF THE INVENTION

In the essence of security, this invention expands game security to a higher level. Through the use of image capturing means, e.g., a small digital camera, an image of the face value of each card is taken and stored in computer memory. This image is stored in the format of a bit map image. The operator of the machine would be able to recall, through the use of a key pad, the images of the cards that comprised the individual hands in the previous game or games. This feature would allow the verification of a winning hand after the game had been completed.

One of the biggest game security issues is that of two adjacent players trading cards to produce a winning hand for one of them. The present invention would allow a quick recheck of hands before paying a winning hand. These card images would be stored in memory for archival access for use in monitoring the randomness of the game and determining the number of winning hands. Such information would be very valuable in managing game play.

Therefore, it is an object of the invention to provide a card playing system which shuffles and deals playing cards, and provided with a means for capturing images of the cards being dealt for use in verification, thereby enhancing security matters regarding casino games.

It is another object of the invention to provide a card shuffler which can selectively shuffle playing cards for different card games and/or for different shuffling modes of operation, and capable of capturing the images of the cards that are dealt.

It is another object of the invention to provide a card shuffler capable of displaying the images of the playing cards to an operator for verification of winning hands.

It is an additional object of the invention to provide a card shuffling machine that selectively shuffles cards for at least two different card games having different shuffling requirements and between at least two selectable modes of operation which can be defined by at least the two different card games, with the added security of card image capturing and relaying of the images for each play station.

It is another object of the invention to provide a card playing system which is simplified and inexpensive to manufacture which provides image capture and on-site image display of the cards being dealt.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

This disclosure of the invention is submitted in furtherance of the constitutional purposes of the United States Patent Laws "to promote the progress of science and useful arts" (Article 1, Section 8).

In accordance with a preferred embodiment of the present invention, herein is described a card shuffler machine which is capable of eliminating one of the most significant security issues, cheating by the substitution of cards. These security issues are more prevalent in specialty card games, such as, but not limited to Pai Gow Poker. The nature of these games provides possibilities of interactions between card players and/or card counters to manipulate the outcomes of the winnings. As novel means of enhancing game security are needed, the present invention addresses this need by featuring a card shuffler device 100 which can capture an image of the playing cards being dealt, as illustrated generally in FIG. 1.

Figure 1:
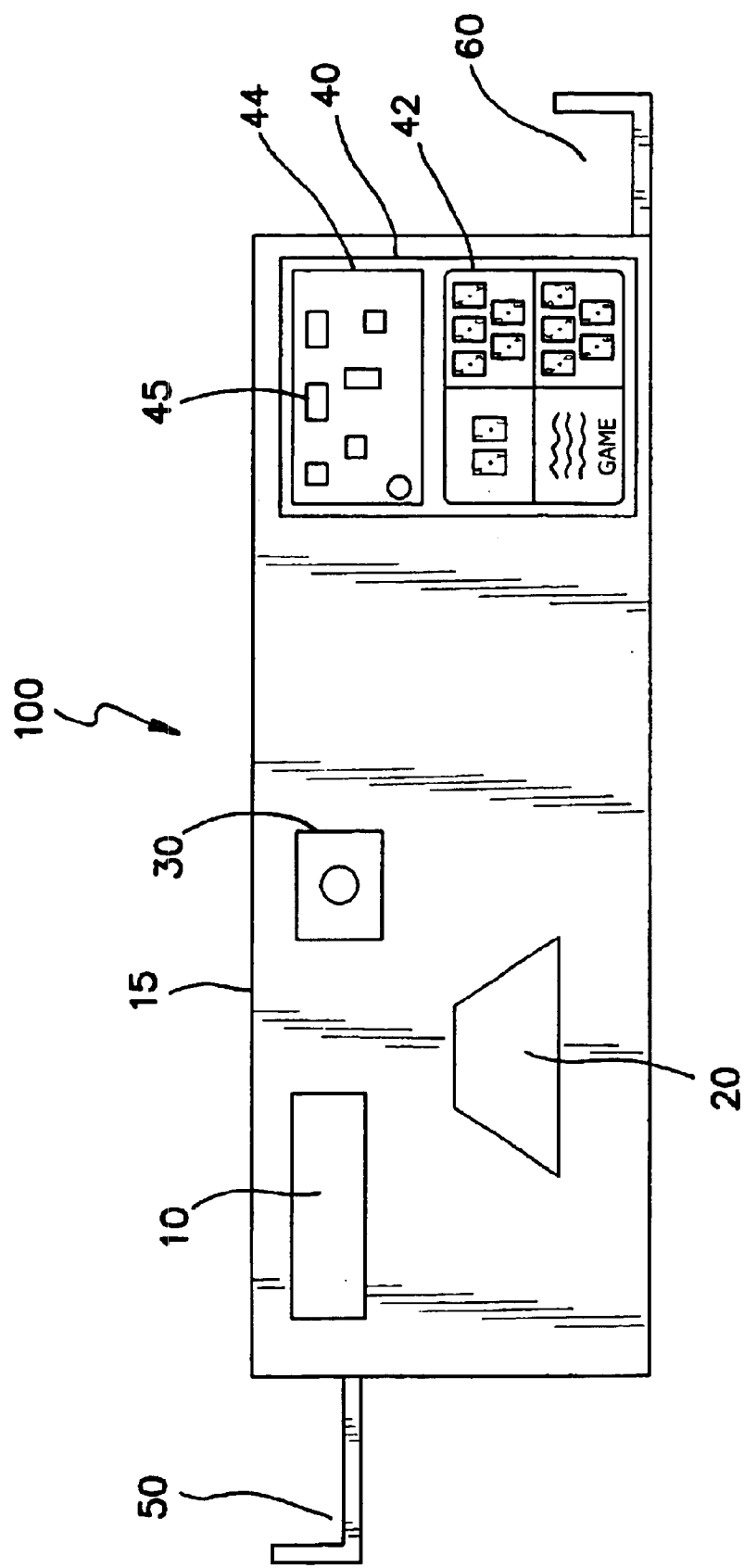
FIG. 1 is a plan view of the preferred embodiment of the invention.

FIG. 1 generally illustrates a diagrammatic or schematic depiction of the card shuffler system 100 of the present invention. The system 100 includes six major components of operation: the controller 10, the shuffling device 20, image capturing means 30, control panel 40, a card input receptacle 50, and card output bin 60.

Figure 2:
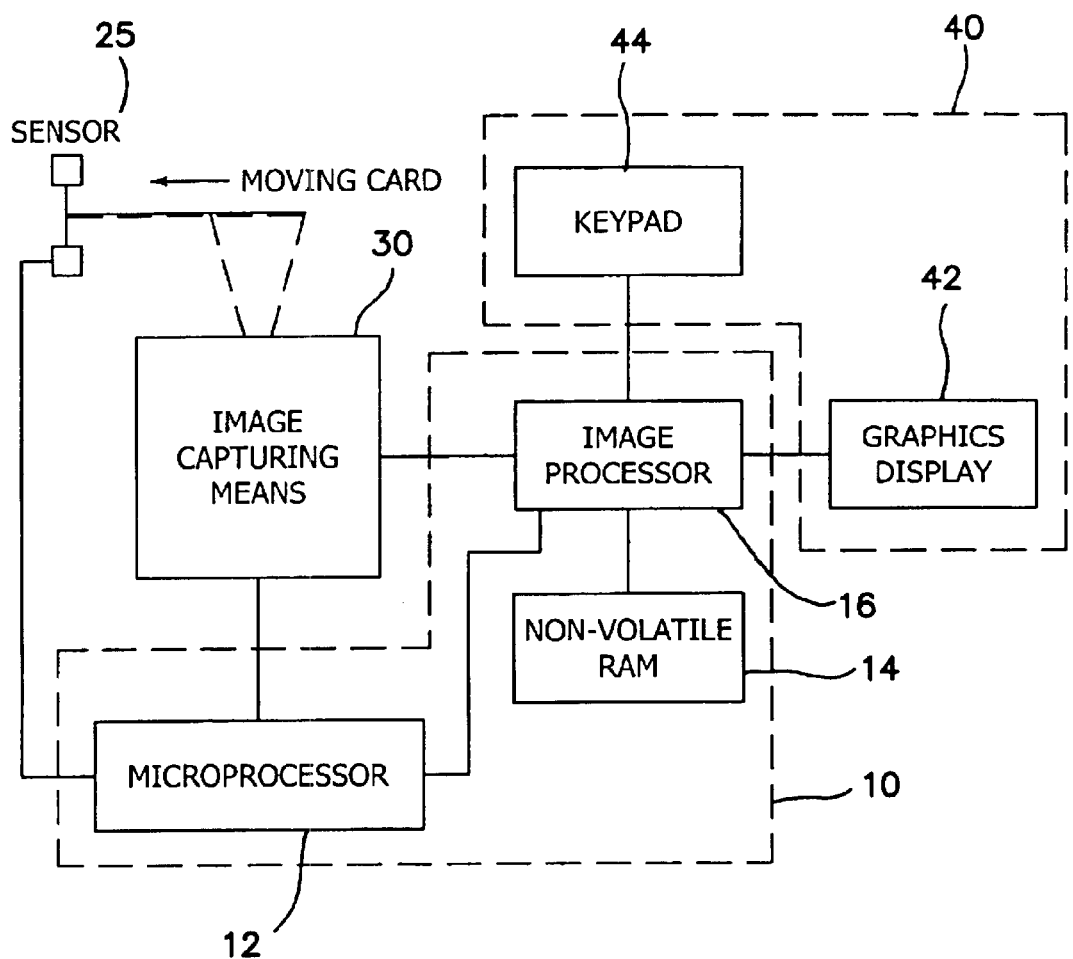
FIG. 2 is a schematic view of a preferred embodiment of the invention illustrating the components in operation.

Preferably, the housing 15 is made of sheet metal (such as aluminum), durable plastic or other tough, durable materials. The keys 45 on keypad 44 are preferably tactile feedback keys, and include indicia thereon for identifying the command the key communicates to the microprocessor 12 (FIG. 2). The keys can also be made of silicon ribber-carbon as is typical for such keys, or the key pad can be a membrane keypad. Controller 10 (and ultimately microprocessor 12) controls the operation of the shuffler system 100 by accepting input data from control panel 40, and displaying output data on display 42. However, it will be understood that other display technologies known in the art, for example, vacuum flourescent, flat panel display, and segmented LED's, are within the scope of the present invention.

The controller 10 is a system that controls the operation of the shuffling device 20, image capturing means 30, and display means 40 as well as the movement of the cards through the shuffler system 100. The contoller 10 contains a suitable microprocessor which serves to orchastrate the operation of all of the components of the shuffler system 100.

This invention includes novel methods for performing automated shuffling of playing cards. The methods include shuffling the cards in a face-to-back relationship which results in a random order. The face-to-back relationship refers to the standard condition in which playing cards are sold wherein the face of one card is adjacent to the back of the next adjacent card. Herein, the present invention dismisses the need for pre-marked playing cards. Ordinary, un-marked playing cards may be used with ease.

The novel shuffling methods further include the ability to shuffle cards in more than one mode and for a plurality of card games as desired. In the card shuffling arts, two types of shufflers have been introduced. One is a batch mode shuffler, the other is a continuous mode shuffler.

The batch mode shuffler is a device that shuffles a deck or multiple decks of playing cards into a random order. The deck or decks are, at one time, loaded into the shuffler system 100, usually into an input receptacle 50. The cards are shuffled or re-ordered and presented to the output bin 60. The decks are removed all at once by a person (dealer) who divides the stack of cards, records (cuts) them, and places a marked cut card in the deck in a random position. The dealer then places the cards into a dealing shoe for individual dealing to players in a card game.

At the conclusion of each game, the cards of the hands that have been played by the players are collected from each playing station and discarded face down by the dealer into a discard shoe (not shown). The decks are then placed into the input receptacle 50 and forwarded to the shuffling device 20 to be re-shuffled to begin a new game. This process may include two sets of decks of different color card backs. One set would be shuffling while the other is being played. This reduces the time the game is stopped for shuffling, allowing the dealer to play more hands with the players.

The continuous shuffler is a device that shuffles or re-orders a deck or multiple decks of playing cards into a random order. In the use of this mechanism, the cards are constantly being shuffled by the shuffler system 100. At the end of each game, the cards are discarded directly into the input receptacle 50 of the shuffler 100. A dealing shoe (not shown) is generally built into the output bin 60 of the shuffler 100. The shuffling never stops as long as the game is being played or being prepared to play.

The process of discharging the playing cards is preferably performed by the ejection and displacing of playing cards and forcing them into an output bin 60, for example, as described in detail in U.S. Pat. No. 6,299,167, incorporated herein by reference. Extracting the cards is accomplished by engaging edges of the selected displaced card using a movable extractor. The step is more preferably accomplished by rolling the edges of the selected card using an extraction roller or rollers (not shown). The cards are further guided toward the output bin via an output roller. The image capturing means 30 may be placed between the extraction roller(s) and the output bin 60 (FIG. 1).

In a preferred embodiment of the present invention, the image capturing means 30 may be a digital camera. A conventional digital camera employing charge-coupled device (CCD) technology to obtain the light information of the captured image may be used. The CCD's consist of a semiconducting array of tightly packed rows of light receptors that can detect variation in light intensity and frequency.

The controller 10 has an image processor 16, as shown in FIG. 2, which digitizes the light information gathered by the camera. This information is digitized by translating the recorded images into bitmaps. The bitmaps will then make use of the digitized information by translating it into an image-representation consisting of rows and columns of dots. The present invention includes an on-site image processor 16 which further translates the bitmaps into pixels for display on the display means 42.

Alternatively, the image capturing means 30 can comprise a digital camera (not shown) utilizing (complementary metal-oxide semiconductor) CMOS technology. Herein, CMOS chips have the advantage of using lower power requirements than CCD's. In addition, the CMOS sensor can be loaded with a host of other tasks that can be translated to the operation of the controller, such as analogue to digital converting, load signal processing, handling white balance and more camera controls. For example, CMOS chips are high resolution sensors with space efficiency capability enabling sensor designs with the possibility of increasing density and bit depth without significant cost increases.

A digital video camera (DV camera) may also be employed to capture digital video images, thereby reducing steps of video microprocessing. The output of a DV camera is already in compressed format. Therefore, all that is needed is to transfer the recorded images straight from the camera for post capture processing.

Analog cameras (non-digital) may be used to capture the image of the cards. These may include video recording cameras. Herein, an analogue-to-digital converter may be used to simplify the image data for display output. Any suitable camera or camera-type device known in the art may be used to capture the image of the playing cards.

Any suitable means for capturing image data known in the art, such as, but not limited to, lenses, mirrors, fiber optics, fiber optical transmission tubes, optical sensor arrays, photosensitive diodes and/or any combinations thereof may be used to capture the photonic information and relayed to any choice of camera means to thereby obtain an image of the playing card.

FIG. 2 is a schematic diagram illustrating a systems approach to the operation of the shuffler system 100. A playing card is put into motion by extraction rollers after the shuffling is performed via instruction from the shuffler controller 10. Once the leading edge of this moving card is sensed by sensor 25, an image of the card is taken by the image capturing means 30. This image data is relayed to the image processor 16. The image processor 16 performs the post-capture processing steps. Herein the image data may be converted, mapped, sharpened and compressed. The controller 10 stores the image data in memory into a non-volatile RAM storage 14.

Figure 3:
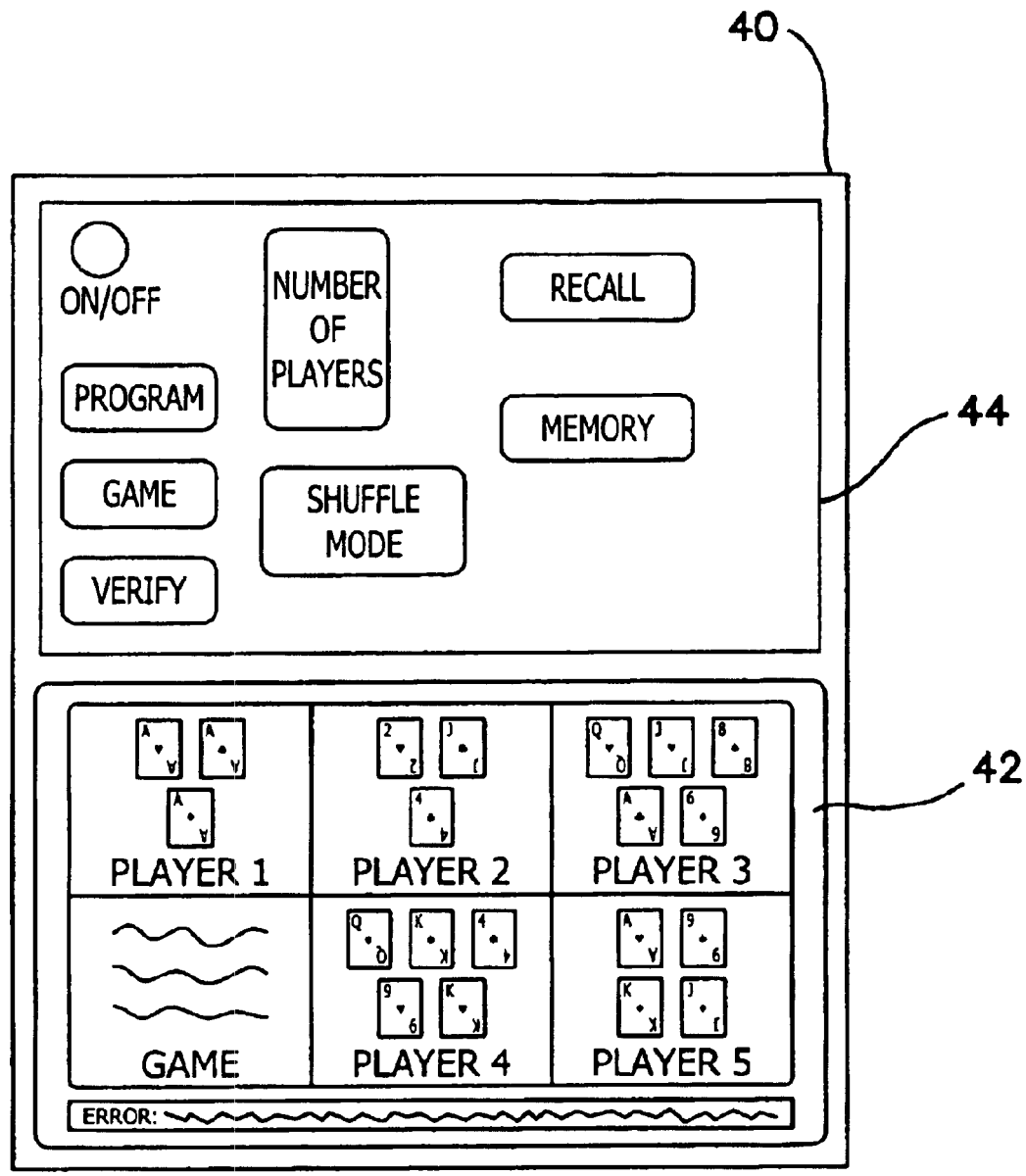
FIG. 3 is a plan view of the control panel in accordance with a preferred embodiment of the present invention.

This stored data may then be recalled, by way of prompt messaging from the keypad 44, located on the control panel 40, for display by the graphics display 42. FIG. 3 provides an exemplary illustration of the control panel 40 including the operations controlled by the keypad 44 and images displayed on the display 42.

The microprocessor 12 controls the various functions of the shuffler system 100, for example, without limitation, the manner of shuffling; whether the shuffling is in batch or continuous mode; the card game, or games, to be shuffled for or dealt, such as Pai-Gow poker, etc. (again, it will be understood that the type of card game is not a limitation on the present invention). The microprocessor 12 can control the output of the cards such that each player is dealt either a packet of consecutive cards from the shuffled deck or every Nth card from the shuffled deck, N being the number of players plus the dealer (if applicable) at the table.

The microprocessor 12 operates under instruction of programmed software. This software can either be stored as firmware in an application specific memory chip, in a solid state non-volatile memory device or on a magnetic disk from which the software is loaded into an addressable RAM in shuffler system 100 when power is turned on. When the shuffler system 100 is first powered on, the software initializes and clears the display 42.

The operation of selected commands associated with the keys 45 of the control panel 40 will now be described. It will be understood that any of the keys 45 can be included anywhere on the shuffler system 100, and not limited to the control panel 40. In operation, when any key, switch or button is activated by depressing, switching or the like, a signal is electrically transmitted to controller 20. A predetermined command is transmitted then from the controller 20. A predetermined command is transmitted then from the controller 20 to the shuffler 100 via transmission means. The shuffler 100 then performs the function associated with the command.

The control panel 40 can also include a "GAME". The "GAME" key (as shown in FIG. 3) allows the operator to select the type of card game to be played. Different card games require different shuffling and/or dealing methods. When the "GAME" key is depressed, the name of a card game appears on the display 42. The operator can cycle through the different games programmed into the microprocessor's memory by repeatedly pressing the "GAME" key until the desired game is selected. In an alternative embodiment, the control panel 40 can include separate keys for each different card game, or a conventional query keyboard may be used.

The number of players may be entered by a "NUMBER OF PLAYERS" key (also shown in FIG. 3), thereby instructing the microprocessor 12 to deal a desired number of hands. If there are any particular rules or other information that may alter gameplay, a "PROGRAM" key may be employed to make appropriate changes.

The keypad 44 can include a "VERIFY" key. The "VERIFY" key is provided so that the operator can verify the number of cards that are in the deck at a desired time. Via the microprocessor 12, the shuffler system 100 keeps track of the number of cards that have been dealt during a dealing sequence. After a game, when the "VERIFY" key is pressed, the remaining cards are ejected out of the shuffler 100 into the output bin 60 and counted as they are ejected. This number is added to the number of cards that have been dealt to verify that there is a correct amount of cards in the deck (for example, 52, if one deck is being used). If the number of cards counted is incorrect, the dealer is notified, for example, by a phrase on the display 42, and/or an audible sound via an internal speaker (not shown).

The keypad 44 can also include a key or keys, such as a "GAME" key (as shown in FIG. 3) that prompts the shuffler system 100 to deal a certain number of cards, although it will be understood that any number is within the scope of the present invention.

Also, on the keypad 42 is a "RECALL" key that propmts the shuffler system 100 to recall the present hand or hands dealt to the playing stations. Herein, the images of the cards that are stored in memory 14 are recalled for display on the display means 42. Along with the images of the cards being displayed, textual messages are displayed to designate the cards of each playing station, accordingly.

For example, the phrase "PLAYER1" may be displayed along with the images of the cards dealt to that particular player, and so forth. A "MEMORY" key may be used, as shown in FIG. 3, to recall the playing hands dealt for past card games. This "MEMORY" key may have subkeys to cycle through the hands, games, and/or playing stations. The images of the past games are accessed from the memory 14 and displayed on the display means 42.

The keypad 44 can also include other keys such as "SHUFFLE MODE" for selecting the mode of the shuffler, namely, continuous mode, batch mode, the game or games being played, or specialty game mode. The function of the various keys, switches or buttons recited herein is intended to be merely exemplary, and those skilled in the art will be able to make numerous modifications and additions to them without departing from the spirit of the present invention. Moreover, various keys may be soft keys, the function of which is defined by the bottom line on the display 14. The function of the soft keys may change, for example, with the type of game that is selected. This allows for a plurality of functions to be performed while minimizing the number of keys needed.

In a preferred embodiment, the shuffler system 100 includes an indicator for indicating an error condition. Preferably, a designated portion of the display 42 flashes to indicate an error condition. Such error conditions may include, but are not limited to, malfunction of the shuffler, such as a mis-shuffle or a jam in the shuffler, a failure in the electronics, bad deck count, i.e., too many or too few cards in the deck, etc. When the controller 10 receives an error signal, the controller 10 communicates a signal to the "ERROR" indicator, thereby activating the display 42 to indicate the error condition to the operator. Preferably, the display 42 indicates to the operator what the error condition is via an accompanying text message adjacent the "ERROR" indicator.

In a preferred embodiment, the shuffler system 100 includes a device for emitting an audible signal when an error condition is detected. For example, a speaker (not shown) such as an electromagnetic or piezoelectric speaker or the like that emits a beep or buzz when an error condition is detected. Preferably, the electromagnetic speaker is in communication and cooperates with the "ERROR" indicator on the display 42. However, it may be noted that the "ERROR" indicator may be located exterior to the display 42 and may be included on any portion of the housing 15.

In another embodiment, the controller 10 can be programmed to display messages on the display 42 in different languages, such as French, Spanish, Italian, etc. A key can be included for cycling through the various language choices.

The display may preferably be in the form of a conventional liquid crystal display format (LCD). The display means 42 can be a color or non-color LCD display panel. The display panel 42 may also display image and text data in a plurality of sections to show a plurality of playing station information simultaneously. However, the display screen may have a scroll feature to display different screens of information which cannot be contained in a single display. The subsequent screens can be prompted by a "SCREEN" key, as shown in FIG. 3.

Since other modifications and changes varied to fit particular operating requirements and environments will be apparent to those skilled in the art, the invention is not considered limited to the example chosen for purposes of disclosure, and covers all changes and modifications which do not constitute a departure from the true spirit and scope of the invention.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Having thus described the invention, what is desired to be protected by Letters Patent is presented in the subsequent appended claims.

What is claimed is:

1. A card shuffling apparatus comprising: a housing, a card input receptacle located on said housing adapted to receive at least one deck of unshuffled playing cards, a shuffling device adapted to receive the cards from said card input receptacle and for selectively shuffling the cards, and a controller disposed within said housing, an image capturing means disposed within said housing for capturing image data of a playing card, said image data being captured after the shuffling of the cards but prior to individual cards being moved to an output bin adapted to receive shuffled playing cards, and a display means located on said housing for displaying images captured by said image capturing means.

2. The card shuffler apparatus, as in claim 1, further comprising: a control panel located on said housing, said control panel having keys operatively connected to said controller for selecting operation functions of the card shuffler.

3. The card shuffler apparatus of claim 2 wherein said display means is located on said control panel.

4. The card shuffler apparatus of claim 3, wherein said controller comprises: a microprocessor, a non-volatile memory storage means for storing images of said playing cards, an image processing means for processing the image data collected by said image capturing means.

5. The card shuffler apparatus of claim 4, wherein said controller contains software adapted to control the operation of the image capturing means.

6. The card shuffler apparatus of claim 4, wherein said non-volatile memory storage means has the capacity to store image data of multiple playing cards, for a plurality of playing stations, for a plurality of games.

7. The card shuffler apparatus of claim 6, wherein said controller contains software adapted to control said display means; said display means adapted to display images of multiple playing cards for a plurality of play stations upon command.

8. The card shuffler of claim 3, wherein said display means is a liquid crystal display adapted to display card images in conjunction with textual messages.

9. The card shuffler apparatus of claim 1, wherein said image capturing means is in a camera.

10. The card shuffler apparatus of claim 9, wherein said camera is a digital camera.

11. The card shuffler apparatus of claim 9, wherein said camera is a digital video camera.

12. A method for shuffling and dealing playing cards for card games, said method comprising the steps of:

a) causing unshuffled cards to be placed into an card input receptacle of an automatic card shuffler;
b) causing the card shuffler to be activated such that the cards are shuffled;
c) individually moving the shuffled cards to a card output bin;
d) capturing an image of each of said playing cards before each card is delivered to the output bin of said card shuffler;
e) storing the captured images;
f) processing said captured images; and
g) displaying said processed, captured images on display means incorporated on said card shuffler.

13. The method for shuffling playing cards, as in claim 12, wherein said processing step further comprises: converting said image from analog to digital form, mapping said converted data for bitmap format, and compressing said image.

14. The method for shuffling playing cards, as in claim 13, wherein said processing step further includes storing said image data, of multiple playing stations for a plurality of games played, into bitmap images.

15. The method for shuffling playing cards, as in claim 14, wherein said step of displaying further includes displaying said bitmap images on a liquid crystal display.

16. The method for shuffling playing cards, as in claim 15, wherein said displaying step further comprises displaying multiple card images, for multiple playing stations for a plurality of games played, for verification of winning hands.

* * * * *